US009584444B2

(12) United States Patent
Lang et al.

(10) Patent No.: US 9,584,444 B2
(45) Date of Patent: *Feb. 28, 2017

(54) ROUTING COMMUNICATION BETWEEN COMPUTING PLATFORMS

(71) Applicant: INTERNATIONAL BUSINESS MACHINES CORPORATION, Armonk, NY (US)

(72) Inventors: Jakob C. Lang, Altdorf (DE); Andreas Maier, Stuttgart (DE); Angel Nunez Mencias, Stuttgart (DE); Rene Trumpp, Geislingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/800,163

(22) Filed: Jul. 15, 2015

(65) Prior Publication Data

US 2016/0021217 A1 Jan. 21, 2016

(30) Foreign Application Priority Data

Jul. 21, 2014 (GB) .................................. 1412861.5

(51) Int. Cl.
*G06F 15/16* (2006.01)
*H04L 12/947* (2013.01)

(52) U.S. Cl.
CPC .................................. *H04L 49/25* (2013.01)

(58) Field of Classification Search
CPC .......... H04L 67/42; H04L 49/25; H04L 67/16
See application file for complete search history.

(56) References Cited

U.S. PATENT DOCUMENTS 6,654,812 B2 11/2003 Gioquindo et al.
6,778,540 B1 8/2004 Ratcliff et al.
7,272,139 B2 9/2007 Fitzpatrick et al.
7,424,710 B1 9/2008 Nelson et al.
8,028,071 B1 9/2011 Mahalingam et al.
8,122,280 B2 * 2/2012 Ngan .................. G06F 11/1438 714/1
2002/0178268 A1 * 11/2002 Aiken, Jr. ............... H04L 29/06 709/228

(Continued)

OTHER PUBLICATIONS

IBM Redbook 'IBM Data Center Networking: Planning for virtualization and cloud computing' (Feb. 10, 2011) to Girola et al. ("Girola").*

(Continued)

*Primary Examiner* — June Sison
(74) *Attorney, Agent, or Firm* — Robert J. Shatto

(57) ABSTRACT

Routing communication in a data processing system. Communication is routed from a communication client having no own communication stack through a first own communication stack of a first communication bridge, and through a second own communication stack of a second communication bridge. Routing between the communication client and the first and the second communication bridges uses a communication mechanism that does not include an own communication stack. One of the first or the second communication bridges is configured to act as a master communication bridge, and the other of the second or the first communication bridges is configured to act as a slave communication bridge.

20 Claims, 10 Drawing Sheets

(56) References Cited

U.S. PATENT DOCUMENTS

| | | | | |
|---|---|---|---|---|
| 2008/0059644 | A1* | 3/2008 | Bakke | H04L 67/2895 709/230 |
| 2008/0184273 | A1 | 7/2008 | Sekar | |
| 2011/0153772 | A1 | 6/2011 | Decker et al. | |
| 2011/0173295 | A1 | 7/2011 | Bakke et al. | |
| 2012/0317289 | A1* | 12/2012 | Fitzpatrick | H04L 12/4641 709/226 |
| 2012/0317567 | A1* | 12/2012 | Bailey | H04L 41/04 718/1 |
| 2013/0111059 | A1* | 5/2013 | Pope | H04L 69/161 709/231 |
| 2013/0332678 | A1 | 12/2013 | Fitzpatrick et al. | |

OTHER PUBLICATIONS

Search Report under Section 17(5), Application No. GB1412861.5, dated Jan. 22, 2015, 4 pages.

Wei et al., "Towards Scalable and High Performance I/O Virtualization—A Case Study," Third International Conference High Performance Computing and Communications, Sep. 26-28, 2007, 13 pages.

Franzki, I., "z/VSE Fast Path to Linux on System Z," IBM System z, Live Virtual Class, Z Journal, Oct. 2011, 28 pages.

Schmidbauer et al., "Enhanced Networking IBM z/VSE," IBM Redbook Form No. SG24-8091-00, Dec. 2014, Copyright International Business Machines Corporation, 254 pages.

Examination Report under Section 18(3), Application No. GB1412861.5, dated Mar. 17, 2016, 1 page.

Notification of Grant: Patent Serial No. GB2528441, Application No. GB1412861.5, dated Apr. 19, 2016, 2 pages.

* cited by examiner

ROUTING COMMUNICATION BETWEEN COMPUTING PLATFORMS

PRIOR FOREIGN APPLICATION

This application claims priority from United Kingdom patent application number 1412861.5, filed Jul. 21, 2014, which is hereby incorporated herein by reference in its entirety.

BACKGROUND

One or more aspects relate in general to data processing systems, and in particular, to routing communication between computing platforms of a data processing system and external networks.

In recent years the capacity of mainframe class servers has grown, and the quantity of data they are required to handle has grown with them. As a result, the existing prior art computer architectures required modifications to support an order of magnitude increase in the bandwidth. In addition, new Internet applications increased the demand for improved latency. Adapters were needed to support more users and a larger number of connections to consolidate the external network interfaces. The combination of all of the above requirements presented a unique challenge to prior art server I/O subsystems. An enhanced version of an I/O architecture for the mainframe is called queued direct I/O (QDIO). The architecture was initially exploited for Gigabit and Fast Ethernet adapters. More recently the architecture was exploited by the OSA-Express (Open System Architecture-Express) network adapter for Asynchronous Transfer Mode (ATM) and high speed Token Ring connections, and it was exploited by socket network communication for internal virtual machine to virtual machine (logical partition to logical partition) connections. In each of these features, the TCP/IP stack is changed to tightly integrate the new I/O interface and to offload key TCP/IP functions to hardware facilities. For external communications, the offloaded functions are performed by the OSA-Express hardware microcode. The result is a significant improvement in both latency and bandwidth for sockets-based messaging which is transparent to the exploiting applications.

In a multiprocessor environment or a logically partitioned computer as described above, it is often desirable to move data from one processor to another or from one partition to another one. Yet, on an operating system level, it is a significant challenge to develop new network device drivers for each new hardware to be used for communication, as e.g., a TCP/IP communication.

US 2013/0332678 A1, incorporated herein by reference in its entirety, discloses a method for exchanging data with a targeted host using a shared memory communications model. A shared memory communication (SMC) component provides a transparent sockets based communications solution in two variations: a local variation (when the virtual hosts reside on the same physical computing platform having direct access to the same physical memory) by locating a shared memory buffer element in reliance on a connection status bit array; and a remote variation when the virtual servers reside on separate physical computing platforms, by locating a remote memory buffer element in reliance on Remote Direct Memory Access (RDMA) technology. In both variations, the SMC component copies control information to the targeted host's storage. The SMC component updates a targeted logical partition's local producer cursor based on the control information. The SMC component alerts the targeted host indicating data is available to be consumed. The SMC component copies application data to an application receive buffer. The SMC component determines that an application completes a receive operation. The SMC component, updating the targeted logical partition's local consumer cursor to match the targeted logical partition's producer cursor, is responsive to a determination that the application completed the receive operation.

SUMMARY

According to one aspect, a method is provided for routing communication in a data processing system comprising a communication client running a first operating system having no own communication stack, a first communication bridge running a second operating system having an own communication stack, and a second communication bridge running a third operating system having an own communication stack. The method includes, for instance, routing communication from the communication client through the own communication stack of the first communication bridge and routing communication through the own communication stack of the second communication bridge, such routing between the communication client and the first and the second communication bridges using a communication mechanism that does not include an own communication stack; configuring one of the first and the second communication bridges to act as a master communication bridge; and configuring the other of the second and the first communication bridges to act as a slave communication bridge.

BRIEF DESCRIPTION OF THE DRAWINGS

Aspects of the present invention together with objects and advantages may best be understood from the following detailed description of the embodiments, but not restricted to the embodiments, wherein is shown in.

DETAILED DESCRIPTION

Figure 1:
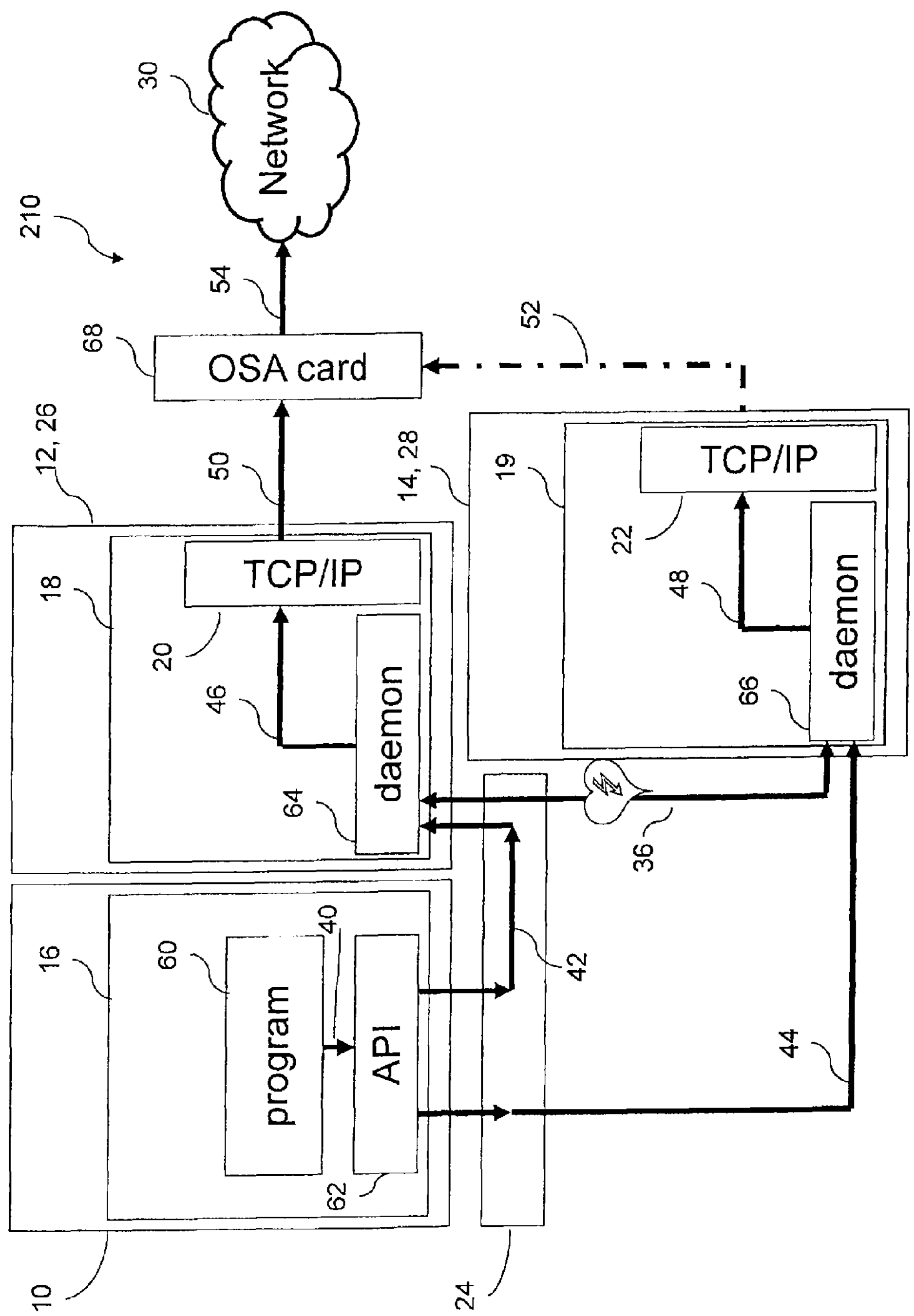
FIG. 1 a data flow of outbound communication traffic according to an embodiment of the invention using TCP/IP communication stacks and an OSA card for communicating with a network.

In the drawings, like elements are referred to with equal reference numerals. The drawings are merely schematic representations, not intended to portray specific parameters of the invention. Moreover, the drawings are intended to depict only typical embodiments of the invention, and therefore, should not be considered as limiting the scope of aspects of the invention.

FIG. 1 is representing a data flow of outbound communication traffic according to an embodiment of the invention using TCP/IP communication stacks 20, 22 and an OSA card 68 for communicating with a network 30. According to one or more aspects, a method for routing communication in the data processing system 210 includes a communication client 10 running a first operating system 16 having no own communication stack, a first communication bridge 12 running a second operating system 18 having an own communication stack 20, namely a TCP/IP stack in the embodiment shown in FIG. 1, and a second communication bridge 14 running a third operating system 19 having an own communication stack 22, also a TCP/IP stack. The method further includes routing communication from the communication client 10 through the own communication stack 20 of the first communication bridge 12 and routing communication through the own communication stack 22 of the second communication bridge 14, where such routing between the communication client 10 and the first and the second communication bridges 12, 14 is using the communication mechanism 24, e.g. a socket network, that does not include an own communication stack. According to one or more aspects of the described method, one of the first or second communication bridges 12, 14, e.g., in the embodiment shown in FIG. 1 the first communication bridge 12, is configured to act as the master communication bridge 26. Then, the other, i.e. the second communication bridge 14, is configured to act as a slave communication bridge 28. The communication client 10 is sending outgoing data to both, the first and second communication bridges 12, 14, where the master communication bridge 26 is sending the outgoing data through its own communication stack 20 to the network 30. The master communication bridge 26 and the slave communication bridge 28 are exchanging system state information 36 as a heartbeat on a regular basis, where the system state information 36 includes information about a status of the outgoing data and the incoming data. The exchange of the heartbeat 36 in FIG. 1 is routed via the communication mechanism 24, which may be using a socket network. However this is not mandatory, other communication mechanisms, e.g. a TCP/IP connection, may be used for exchanging the heartbeat 36 signals, which do not need to be connected to the communication mechanism 24 exchanging information between communication client 10 and communication bridges 12, 14.

Upon a lack of receiving system state information 36, after a predetermined time interval, the former slave communication bridge 28 would become the master communication bridge 26 and the former master communication bridge 26 would become the slave communication bridge 28, which is generally called a failover. The change of the master communication bridge 26 is implemented as a self-organized process of the data processing system 210 via the information exchange of the different communication bridges 12, 14.

The system state information 36 contains information about a data packet count sent and/or received by the master communication bridge 26, especially about an identifier for the last data packets sent in both directions, to the communication client 10 and to the OSA card 68/network 30. Thus, after a change of the master communication bridge 26, in dependence on the exchanged system state information 36, outgoing data could be resent by the master communication bridge 26 to the network 30 and/or incoming data could be resent by the master communication bridge 26 to the communication client 10.

The communication client 10, as well as the communication bridges 12, 14 are implemented as virtual machines in the data processing system 210, where, e.g., the first and second communication bridges 12, 14 are running a Linux operating system. The communication mechanism 24 is implemented as a socket network, but could alternatively also be implemented as a remote direct memory access network.

Concerning the outbound communication traffic, data packets are sent by the program 60, running on the communication client 10 under the first operating system 16, via connection 40 to the API 62 and via connections 42, 44 from there through the communication mechanism 24, which is implemented as a socket network, to the first communication bridge 12, running the second operating system 18 and being the master communication bridge 26, and to the second communication bridge 14, running the third operating system 19 (which may be of the same kind as the second operating system 18) and being the slave communication bridge 28. The data packets are fed via connections 46, 48 through the daemons 64 and 66 to the TCP/IP communication stacks 20, 22. The TCP/IP communication stacks 20, 22 are connected via connections 50, 52 to the OSA card 68, but only the master communication bridge 26 is sending the data packets to the OSA card 68, indicated by the dash-dotted connection 52 from the slave communication bridge 28. From the OSA card 68 the data packets will be fed via connection 54 to the network 30. Both daemons 64, 66 are exchanging system state information 36 as a heartbeat in order to check if both communication bridges 12, 14 are still alive.

Figure 2:
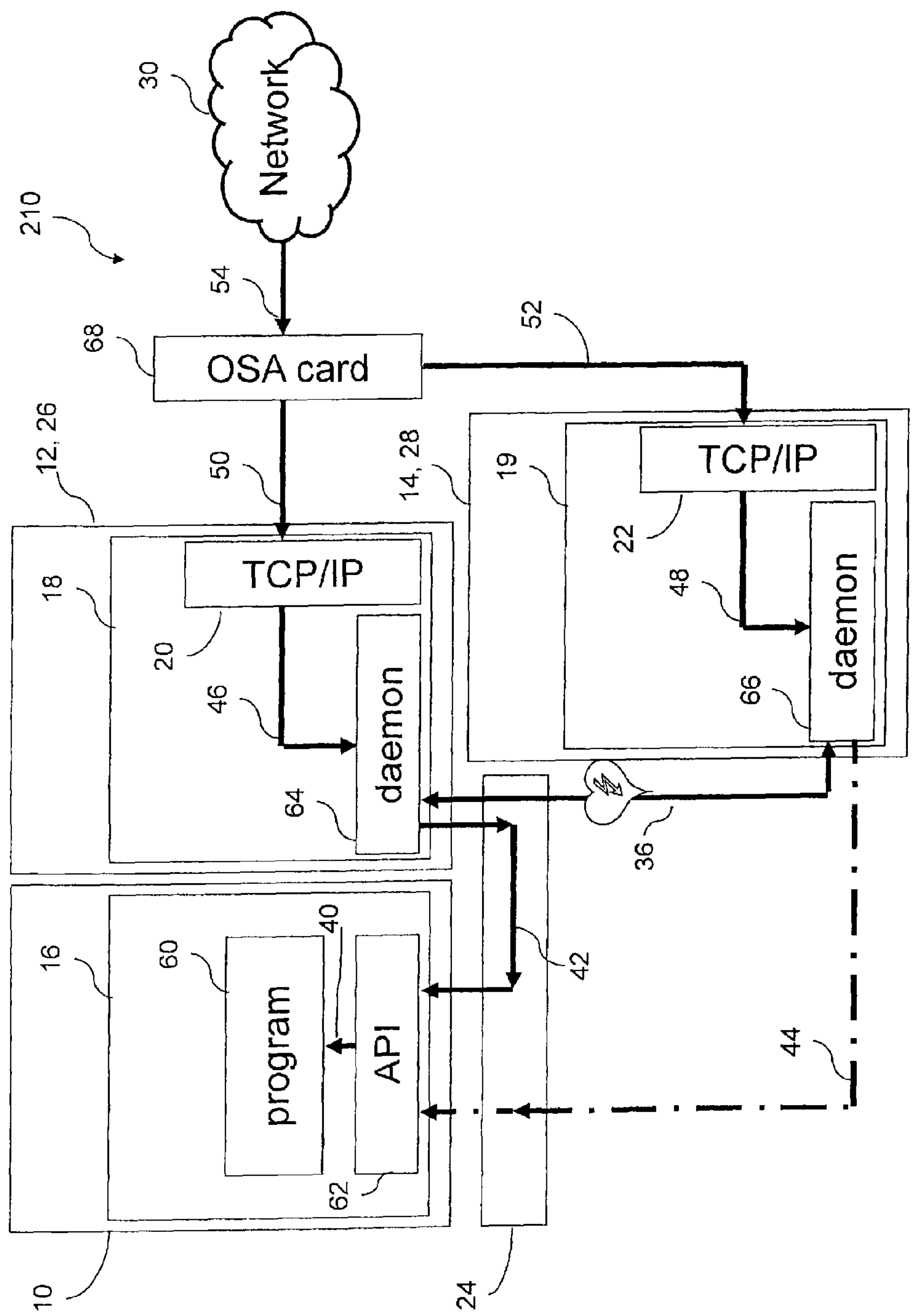
FIG. 2 a data flow of inbound communication traffic according to the embodiment of FIG. 1 using TCP/IP communication stacks and an OSA card for communicating with a network.

FIG. 2 shows contrarily a data flow of inbound communication traffic according to the embodiment of FIG. 1 using TCP/IP communication stacks 20, 22 and an OSA card 68 for communicating with the network 30. The network 30 is sending incoming data through the communication stacks 20, 22 to both the first and second communication bridges 12, 14, where the current master communication bridge 26 is sending the incoming data to the communication client 10.

Data packets are sent from the network 30 via connection 54 to the OSA card 68 and from there via connections 50 and 52 to the TCP/IP communication stacks 20, 22 of the communication bridges 12, 14. The master communication bridge 26 is sending the data packets through the daemon 64 and the communication mechanism 24, implemented as a socket network, via connection 42 to the API 62 of the communication client 10, so that the data packets may be received by the program 60 running on the communication client 10. Via the system state information 36 as a heartbeat it is checked if the master communication bridge 26 is still alive and functional. The connection 44 is marked with a dash-dotted line, because the slave communication bridge 28 is not sending any data, as long as the master communication bridge 26 is still alive. Otherwise, the former slave communication bridge 28 would be switched to the new master communication bridge and the data packets would be sent by the new master communication bridge 14 to the communication client 10.

Figure 3:
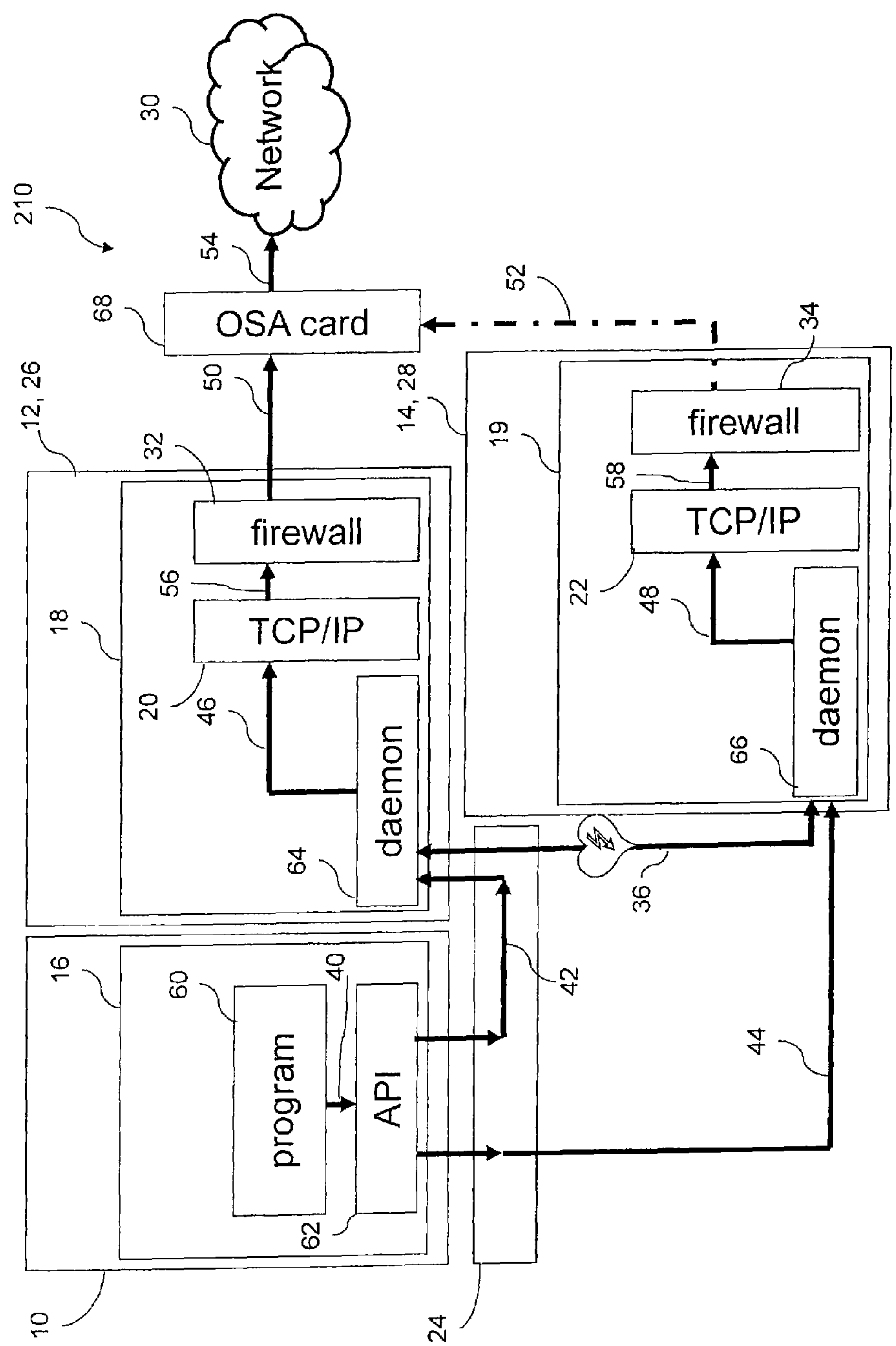
FIG. 3 a data flow of outbound communication traffic according to one embodiment of the invention using TCP/IP communication stacks with firewalls and an OSA card for communicating with a network.

In FIG. 3 a data flow of outbound communication traffic according to an alternative embodiment of the invention using TCP/IP communication stacks 20, 22 with firewalls 32, 34 and an OSA card 68 for communicating with a network 30 is shown. The firewalls 32, 34 are implemented at the output of the first and second communication bridges 12, 14. The data flow is principally the same as in FIG. 1 explained, except from the TCP/IP communication stacks 20, 22 the data packets are not fed directly to the OSA card 68 but via connections 56, 58 through the firewalls 32, 34. The firewall 34 of the slave communication bridge 28 prevents the data from being sent to the OSA card 68, whereas the firewall 32 of the master communication bridge 26 feeds the data through to the OSA card 68. This is marked by the dash-dotted connection 52 from the firewall 34 of the slave communication bridge 28 to the OSA card 68.

Figure 4:
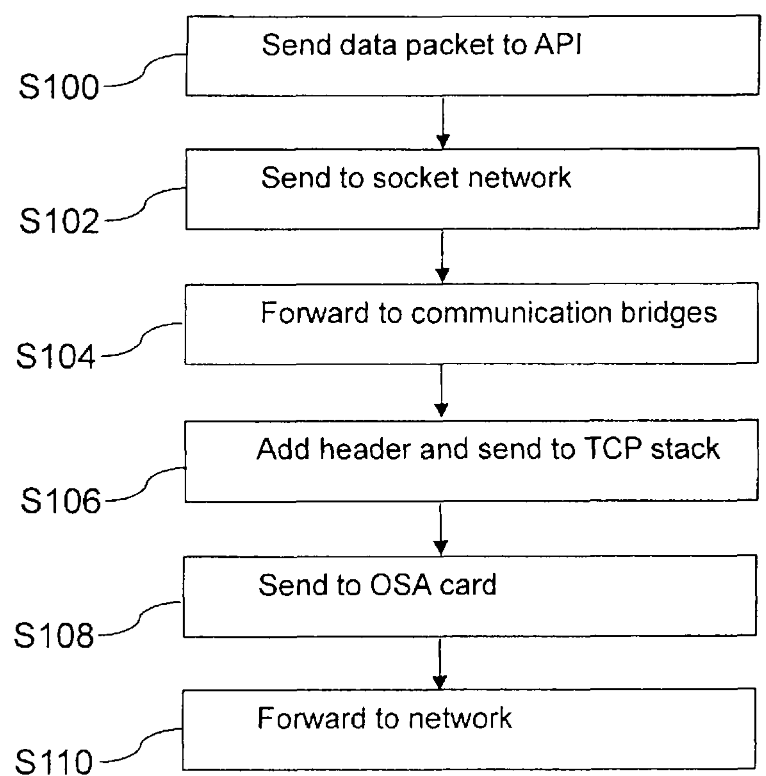
FIG. 4 a flowchart for executing the method according to aspects of the invention for outbound data packets according to an embodiment of the invention.

FIG. 4 shows a flowchart for executing the method according to aspects of the invention for outbound data packets according to an embodiment of the invention, as represented in FIG. 1. In step S100 the application/program 60 on the communication client 10 sends the data packet to the corresponding API 62 of the first operating system 16 on the communication client 10. The API 62 receives the data packet and sends the data packet in step S102 to the socket network as a communication mechanism 24, addressed to both first and second communication bridges 12, 14. The socket network 24 forwards the data packet in step S104 to both first and second communication bridges 12, 14. The master communication bridge 26 processes the data packet by adding a header and sending it to the TCP/IP communication stack 20, step S106. From there the data packet is sent in step S108 to the OSA card 68. The slave communication bridge 28 does not process the data packet if the heartbeat 36 is valid. The OSA card 68 forwards the data packet in step S110 to the network 30.

Figure 5:
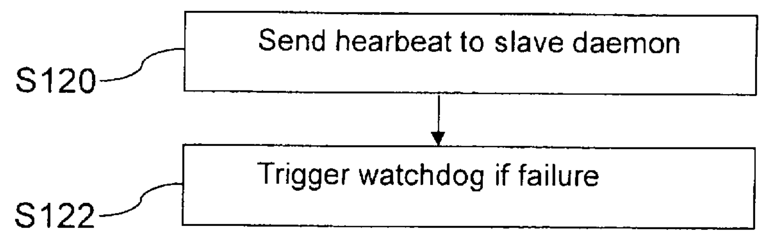
FIG. 5 a flowchart for implementing exchange of the heartbeat for the embodiment of FIG. 1.

In FIG. 5 a flowchart for implementing the exchange of the heartbeat 36 for the embodiment of FIG. 1 is shown. The daemon 64 on the master communication bridge 26 sends in step S120 in regular time intervals, e.g. milliseconds, a heartbeat 36 to the slave daemon 66. The master daemon 64 implements a watchdog set up with a timeout that is smaller than the time a slave communication bridge 28 waits before becoming a master communication bridge. By this way it is ensured that the old master communication bridge 26 will not become alive automatically as a master communication bridge after having selected a new master communication bridge. The watchdog triggers a reboot (or shutdown) if it is not refreshed, in step S122.

Figure 6:
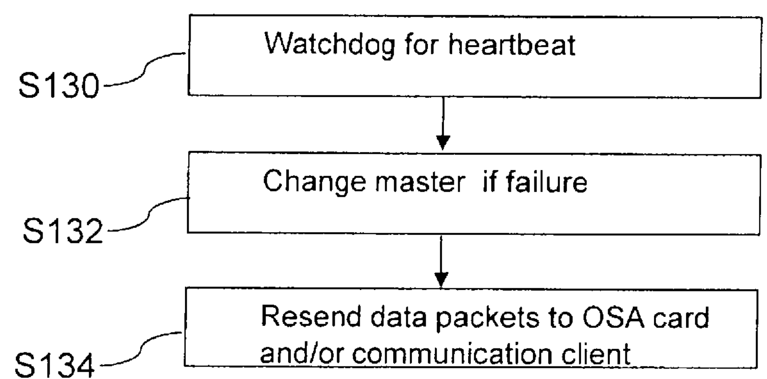
FIG. 6 a flowchart for implementing failovers for the embodiment of FIG. 1.

FIG. 6 shows a flowchart for implementing failovers for the embodiment of FIG. 1. In step S130 a watchdog is set for checking for the heartbeat 36. When the slave daemon 66 does not receive the heartbeat 36 from the master daemon 64, the slave daemon 66 becomes the new master daemon and behaves like it, including forwarding all received data packets, heartbeating, etc., according to step S132. The former slave communication bridge 28 starts sending data packets to the OSA card 68 and/or to the communication client 10, starting with the next data packet, in step S134.

Figure 7:
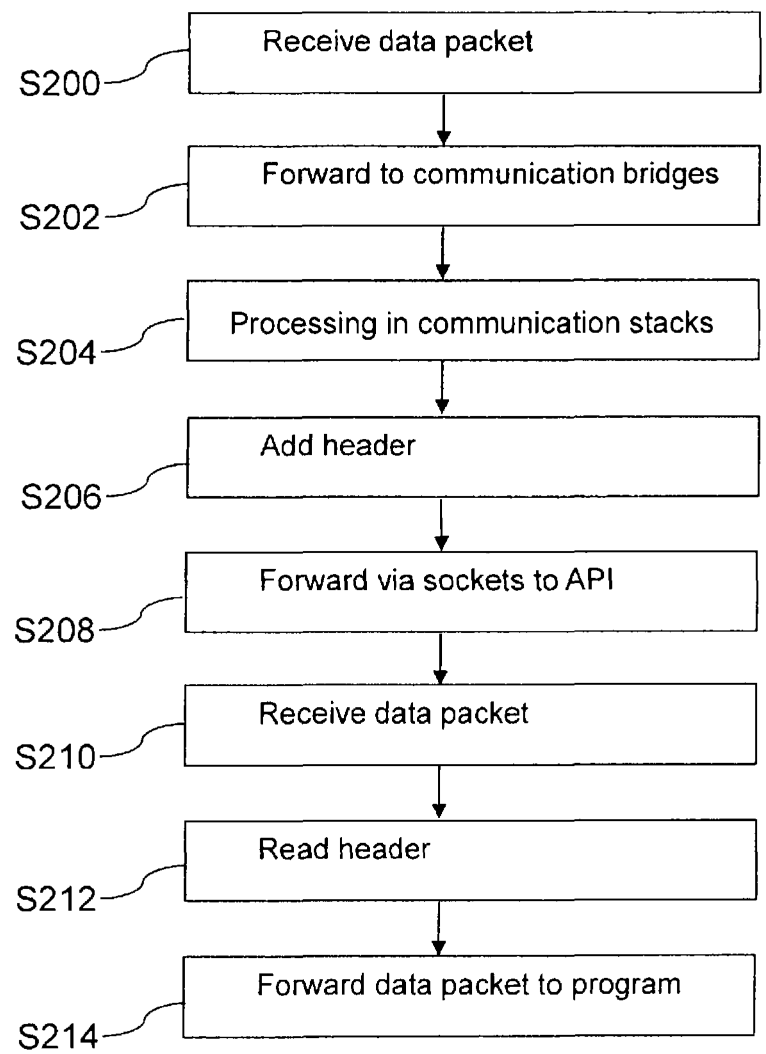
FIG. 7 a flowchart for executing the method according to aspects of the invention for inbound data packets according to an embodiment of the invention.

Contrarily, FIG. 7 shows a flowchart for executing the method according to aspects of the invention for inbound data packets according to an embodiment of the invention, as depicted in FIG. 2. The OSA card 68 receives a data packet in step S200 from a client/network 30 and forwards it in step S202 to both communication bridges 12, 14. In step S204 in both communication bridges 12, 14 the TCP/IP communication stacks 20, 22 process the data packet and forward it to the daemons 64, 66. The master daemon 64 on the master communication bridge 26 adds a header (including its internal incoming packet counter) to the data packet, step S206, and forwards the data packet (including the header) in step S208 via the socket network as a communication mechanism 24 to the API 62 on the communication client 10. The slave daemon 66 buffers the data packet. Both daemons 64, 66 increase their internal incoming packet counter. There are multiple options/alternatives of the usage of the packet counter. One packet counter may be used for each connection. Alternatively, one packet counter may be used for all connections. It is favorable for failover scenarios that the same data packets get the same internal packet counter, so that in a failover the slave communication bridge 28 can resend the correct data packets. It is also an option to use an internal packet counter based on the protocol. So, e.g., the sequence number of TCP packets may be reused. Or, for UDP, no counter could be used because this protocol is stateless and data packets may always be dropped. The API 62 receives the data packet in step S210 and reads the header, step S212. If the internal incoming packet counter is less or equal to the internal incoming packet counter of the last received data packet, it drops the data packet (cleanup of data packets processed). The API 62 forwards the data packet to the corresponding application/program 60 in step S214.

Figure 8:
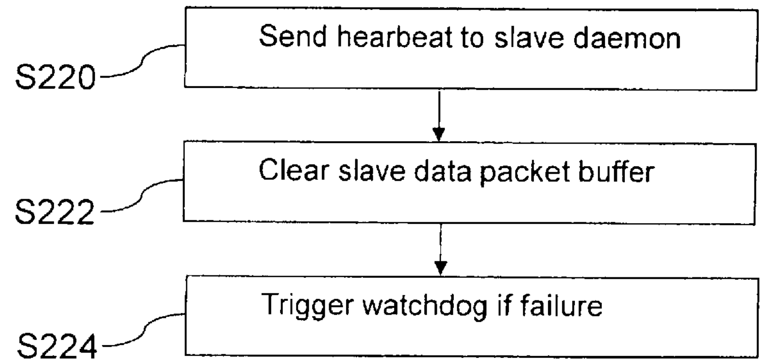
FIG. 8 a flowchart for implementing exchange of the heartbeat for the embodiment of FIG. 2.

FIG. 8 shows a flowchart for implementing the exchange of the heartbeat 36 for the embodiment of FIG. 2. The daemon 64 on the master communication bridge 26 sends in step S220 in regular time intervals, e.g. milliseconds, a heartbeat 36 to the slave daemon 66, including the last used internal incoming packet counter number via the socket network 24 for each TCP connection. The slave daemon 66 on the slave communication bridge 28 clears the data packet buffer in step S222 for all data packets with a less or equal internal incoming packet counter. The heartbeat 36 is sent over the socket network 24, so it is not possible to lose the data packet and run into split-brain scenarios with two master communication bridges. The master daemon 64 implements a watchdog set up with a timeout that is smaller than the time a slave communication bridge 28 waits before becoming a master communication bridge. By this way it is ensured that the old master communication bridge 26 will not become alive automatically as a master communication bridge after having selected a new master communication bridge. The watchdog triggers a reboot (or shutdown) if it is not refreshed, in step S224.

Figure 9:
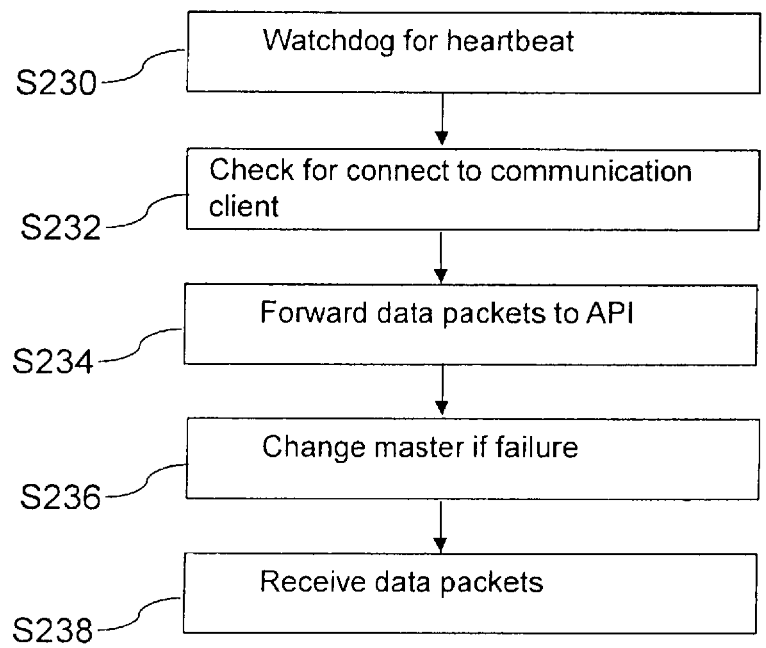
FIG. 9 a flowchart for implementing failovers for the embodiment of FIG. 2.

FIG. 9 shows a flowchart for implementing failovers for the embodiment of FIG. 2. In step S230 a watchdog is set for checking for the heartbeat 36. When the slave daemon 66 does not receive a heartbeat 36 from the master daemon 64, it tests in step S232 if it is still able to connect to the API 62 of the communication client 10. If it is not able to connect to the API 62, it shuts down. If it is able to connect to the API 62 of the communication client 10, it forwards its buffered data packets (including the header) via the socket network 24 to the API 62 of the communication client 10 in step S234. After that, the slave daemon 66 becomes in step S236 the new master daemon and behaves like it, including forwarding all received data packets, heartbeating, etc. In step S238, the new master communication bridge continues receiving data packets and forwarding them to the communication client 10.

Figure 10:
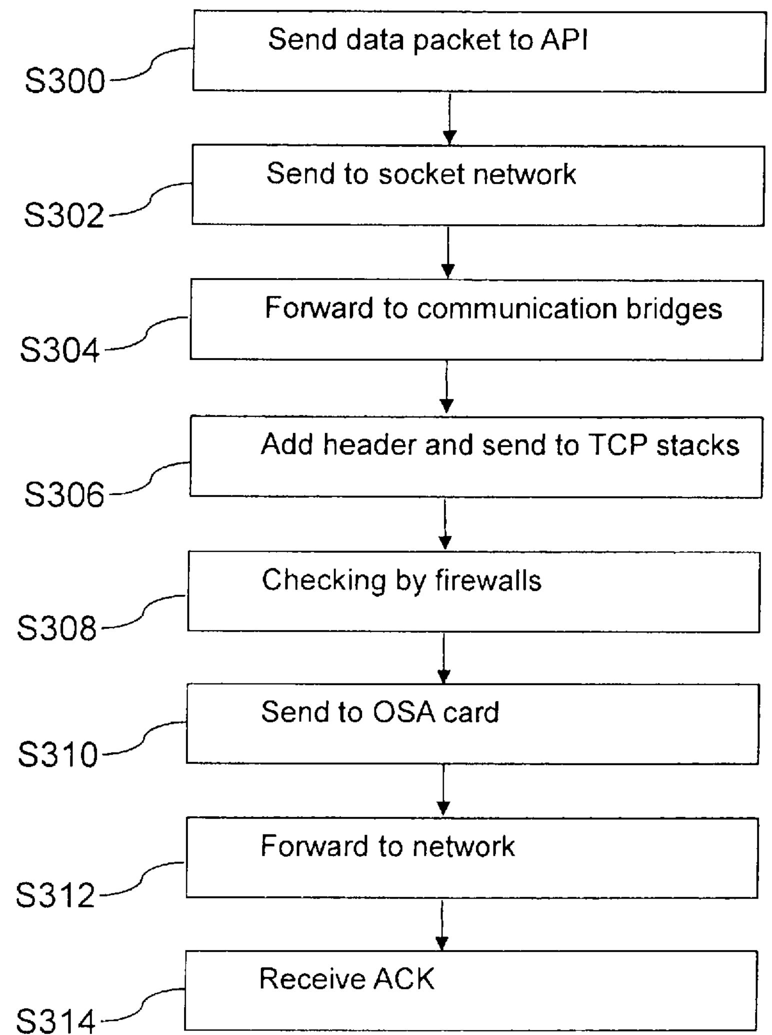
FIG. 10 a flowchart for executing the method according to aspects of the invention for outbound data packets according to one embodiment of the invention with firewalls.

FIG. 10 depicts a flowchart for executing the method according to aspects of the invention for outbound data packets according to an alternative embodiment of the invention with firewalls 32, 34, as depicted in FIG. 3. The application/program 60 sends the data packet in step S300 to the corresponding API 62 of the communication client 10. The API 62 receives the data packet and sends the data packet in step S302 to the socket network as a communication mechanism 24, addressed to both communication bridges 12, 14. The socket network 24 forwards the data packet in step S304 to both communication bridges 12, 14. Both daemons 64, 66 accept the data packet and send it, after adding a header in step S306 to the TCP/IP communication stacks 20, 22. Both TCP/IP communication stacks 20, 22 accept the data packet, update the internal state and process the data packet for firewall checking in step S308. The master firewall 32 allows the data packet to be sent to the OSA card 68 in step S310 and forwards it to the network 30 in step S312. The slave firewall 34 prevents the data packet from being sent to the OSA card 68. Incoming data packets are not blocked by the firewalls 32, 34. A remote TCP stack sends an acknowledge (ACK) packet after receiving the data packet. The ACK is received by both master and slave TCP communication stacks 20, 22 in step S314. The sent data packet is eliminated from the TCP buffer on receiving the ACK.

Figure 11:
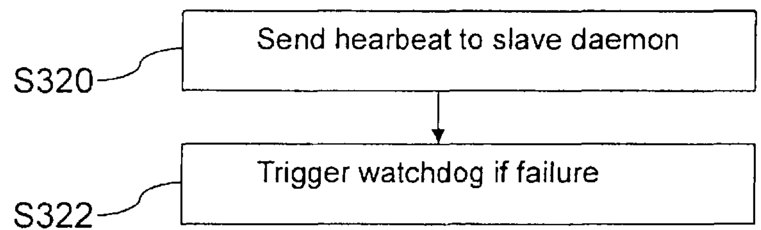
FIG. 11 a flowchart for implementing exchange of the heartbeat for the embodiment of FIG. 3.

FIG. 11 shows a flowchart for implementing exchange of the heartbeat for the embodiment of FIG. 3. The daemon 64 on the master communication bridge 26 sends in step S320 in regular time intervals, e.g. milliseconds, a heartbeat 36 to the slave daemon 66. The master daemon 64 implements a watchdog set up with a timeout that is smaller than the time a slave communication bridge 28 waits before becoming a master communication bridge. By this way it is ensured that the old master communication bridge 26 will not become alive automatically as a master communication bridge after having selected a new master communication bridge. The watchdog triggers a reboot (or shutdown) if it is not refreshed, in step S322.

Figure 12:
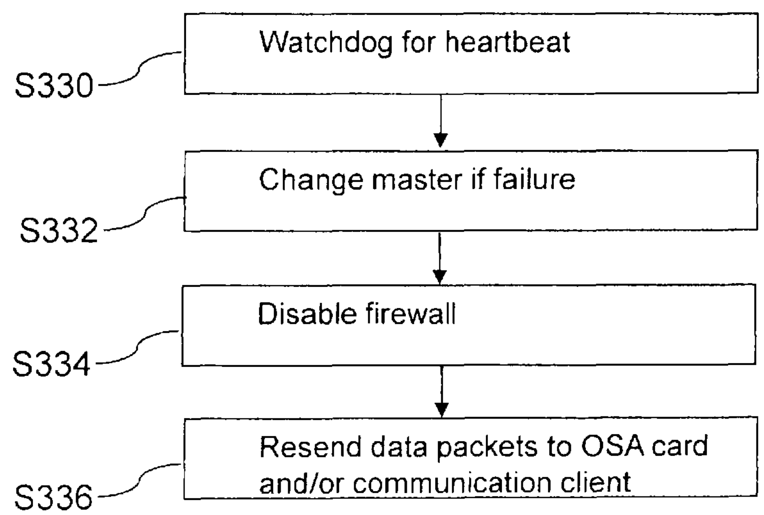
FIG. 12 a flowchart for implementing failovers for the embodiment of FIG. 3.

In FIG. 12 a flowchart for implementing failovers for the embodiment of FIG. 3 is shown. In step S330, a watchdog is set for checking for the heartbeat 36. The slave communication bridge 28 takes over the master function after missing heartbeat 36 in step S332. The firewall 34 of the former slave communication bridge 28 is disabled in step S334. The new master communication bridge 14 starts sending data packets to the OSA card 68 and/or the communication client 10, starting with the next data packet, in step S336. Since both TCP/IP stacks 20, 22 are kept synchronized, the connection can be kept alive and continued by the new master communication bridge 14. That means that applications only see a minimal delay dependent on the heartbeat frequency. Lost data packets in the time since the master communication bridge 26 went offline until the slave communication bridge 28 took over, will be resent automatically by the new master TCP/IP communication stack 22 based on missing ACKs from the remote TCP stack.

Figure 13:
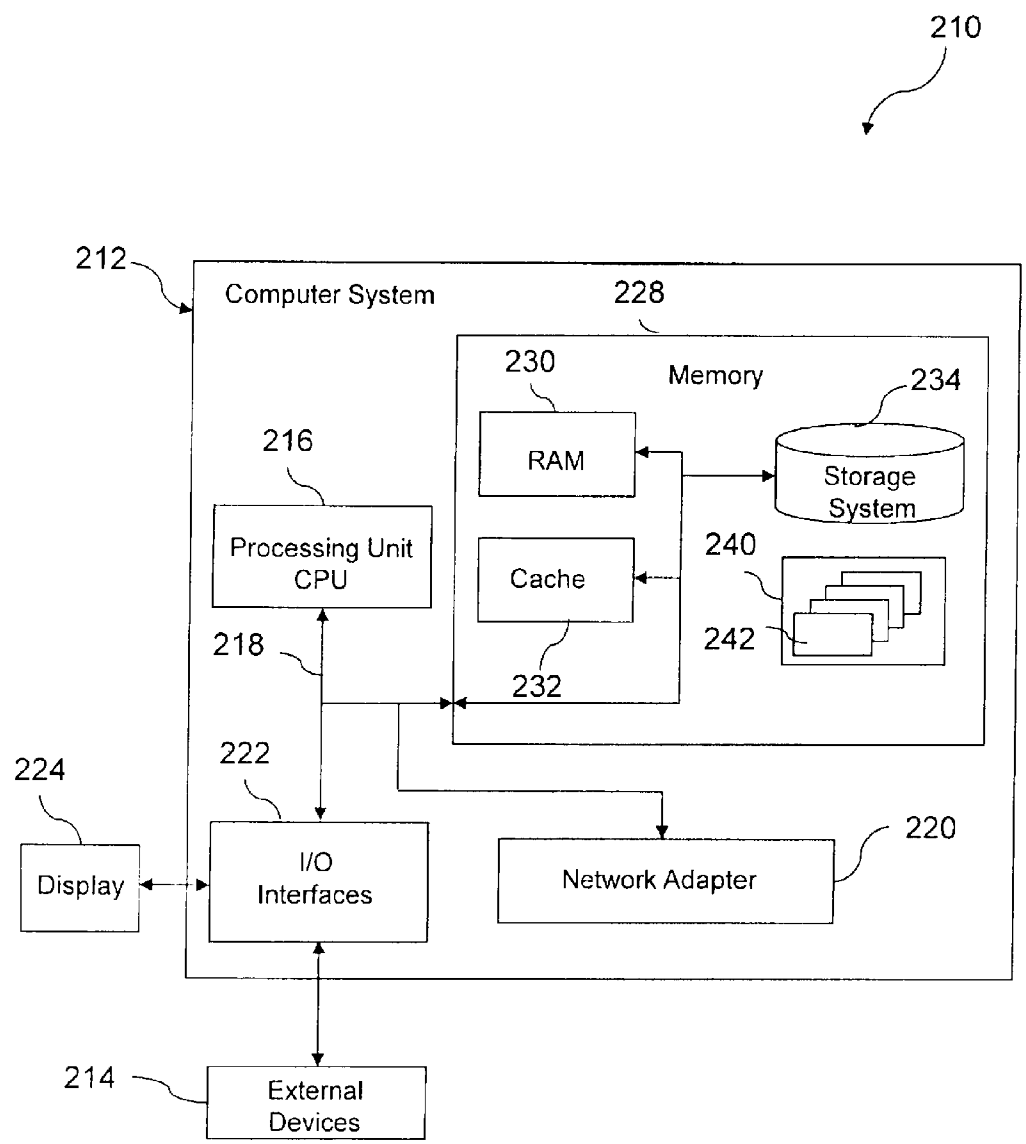
FIG. 13 an example embodiment of a data processing system for executing a method according to aspects of the invention.

Referring now to FIG. 13, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

The data processing system 210 is capable of running a computer program product comprising a computer usable medium including a computer readable program, wherein the computer readable program when executed on a computer system 212 causes the computer system 212 to perform a method for routing communication in a data processing system 210 comprising a communication client 10 running a first operating system 16 having no own communication stack, and a first communication bridge 12 running a second operating system 18 having an own communication stack 20, and at least a second communication bridge 14 running a third operating system 19 having an own communication stack 22, comprising routing communication from the communication client 10 through the own communication stack 20 of the first communication bridge 12 and routing communication through the own communication stack 22 of the at least second communication bridge 14, such routing between the communication client 10 and the first and the at least second communication bridges 12, 14 using a communication mechanism 24 that does not include an own communication stack; configuring one of the first or the at least second communication bridges 12, 14 to act as a master communication bridge 26; and configuring the other of the at least second or first communication bridges 14, 12 to act as a slave communication bridge 28.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, micro-controllers, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data.

Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

As described herein, according to one aspect, a method is provided for routing communication in a data processing system comprising a communication client running a first operating system having no own communication stack, a first communication bridge running a second operating system having an own communication stack, and at least a second communication bridge running a third operating system having an own communication stack. The method includes, for instance, routing communication from the communication client through the own communication stack of the first communication bridge and routing communication through the own communication stack of the at least second communication bridge, such routing between the communication client and the first and the at least second communication bridges using a communication mechanism that does not include an own communication stack; configuring one of the first or at least second communication bridges to act as a master communication bridge; and configuring the other of the at least second or first communication bridges to act as a slave communication bridge.

In one aspect, a communication bridge is defined as a computing platform being implemented as a virtual or physical machine and running an own operating system, which may be Linux or any other commercial or proprietary operating system. The third operating system of the second communication bridge may be the same kind of operating system as the second operating system of the first communication bridge. Alternatively, the operating systems may be different kinds of operating systems.

A communication client is defined, for instance, as a computing platform being implemented as a virtual or physical machine and running an own operating system, which may be any commercial or proprietary operating system. The communication client utilizes one or more services from a communication bridge. The communication client may be implemented as a server, but is called a client because it uses services from the communication bridges as a client.

One or more aspects allow selected communication stack (e.g. TCP/IP, or other protocol stack) applications running on the communication client to communicate with a communication stack of a communication bridge without using a communication stack on the communication client. All socket requests, for example, may be transparently forwarded to the communication bridge, operating on the same virtual machine, or as another virtual machine on the same data processing system, or operating on a different data processing system.

With such a method, it is not necessary to develop communication stacks, such as a TCP/IP stack, for all available computing platforms, but instead, it is possible to utilize already developed communication stacks on certain computing platforms, which may be accessed by employing the method according to aspects of the invention of communicating between a communication client and communication bridges.

Further, with such a method it is not necessary to develop code/support for a new hardware, such as a new network card, for all available computing platforms, but instead it is possible to utilize already developed communication stacks on certain computing platforms, which may be accessed by employing the method according to aspects of the invention for communicating between a communication client and communication bridges.

With the method according to aspects of the invention, the reliability of routing communication in a computing environment is increased by using, e.g., more than one communication bridge on a data processing system. The communication bridges are extended to exchange system state information, like a heartbeat, with the other communication bridges and do a failover if necessary, i.e. change a former slave communication bridge to a new master communication bridge, if the former master communication bridge fails.

A heartbeat can generally be understood as a periodic signal generated by hardware or software to indicate normal operation or to synchronize other parts of the data processing system. Usually a heartbeat is sent between communication bridges at a regular interval of the order of milliseconds. If a heartbeat isn't received for a time usually a few heartbeat intervals—the communication bridge that should have sent the heartbeat is assumed to have failed.

Increasing the reliability of routing communication between communication clients and communication bridges is achieved using the method according to one or more aspects of the invention by increasing the number of the communication bridges with a second and/or third operating system, as e.g. Linux. Changes in the implementation of the data processing system and the firmware of a network interface, as e.g., an open system architecture (OSA) card, enable all communication bridges, that are part of the network communication part, to receive all data packets. Only a so-called master communication bridge will route communication to a network via a network interface. The network interface, on the other hand, will route communication to all communication bridges that are part of the network communication part, but only the master communication bridge will send the data packets to the communication client with the first operating system.

The master communication bridge is sending system state information, as e.g. heartbeats, as well to the other slave communication bridges.

In the heartbeat, an identifier of the last processed data packet is included, in one embodiment. So, if a slave communication bridge does not receive a heartbeat anymore, it may become the new master communication bridge and process all data packets (in both directions) which were not processed yet.

According to one or more aspects of the invention, single points of failure are eliminated, reliability is increased, there is transparency for an application/program, there is transparency for the other side of the communication connection, and these features are with optimized additional resource usage.

Thus, according to one embodiment, the method may include the communication client sending outgoing data to both the first and the at least second communication bridges, where the master communication bridge is sending the outgoing data through its own communication stack to a network; the network sending incoming data through the communication stack to both the first and the at least second communication bridges, the master communication bridge sending the incoming data to the communication client; the master communication bridge and the slave communication bridge exchanging system state information on a regular basis; and the system state information comprising information about a status of the outgoing data and the incoming data.

Due to the method according to one or more aspects of the invention, upon a lack of receiving system state information, after a predetermined time interval, a former slave communication bridge may become the master communication bridge and the former master communication bridge may become the slave communication bridge. Thus if, by any reason, the master communication bridge cannot send data packets anymore, because the software is hanging or there is some hardware failure, which means the heartbeat is missing for a given time interval, another of the at least second communication bridges may become the new master communication bridge and the former master communication bridge will become the slave communication bridge after it recovered from the failure. The new master communication bridge will now send the heartbeat and the data transfer to or from the network will be continued.

In a further embodiment, after a change of the master communication bridge, in dependence on the exchanged system state information, outgoing data may be resent by the master communication bridge to the network and/or incoming data may be resent by the master communication bridge to the communication client. The system state information, as e.g. the heartbeat, exchanged between the master communication bridge and the slave communication bridge contains information about the last data packets sent, so that after the occurrence of a failure and the following change of the master communication bridge, the communication traffic may be continued and the last data packet sent again, but now by the new master communication bridge.

The computing platforms may be implemented as virtual machines in the data processing system. Virtual machines or logical partitions are commonly used in data processing systems and thus may be used as a computing platform implementing the method according to one or more aspects of the invention.

In an embodiment, the communication mechanism may be implemented as a socket network. Sockets as a bidirectional software interface for inter-process or network communication may serve as an embodiment for a network with high reliability, and therefore, be used in the method according to one or more aspects of the invention.

Alternatively, the communication mechanism could be implemented as a remote direct memory access network (RDMA). This communication mechanism too is widely used for network communication and is principally suited for being used by the method according to one or more aspects of the invention.

In an embodiment, the system state information may comprise heartbeat information. A heartbeat, being defined as a periodic signal generated by hardware or software to indicate normal operation or to synchronize other parts of the data processing system, may be used by the method according to one or more aspects of the invention. Usually a heartbeat is sent between communication bridges at a regular interval of the order of milliseconds. If a heartbeat isn't received for a time—usually a few heartbeat intervals—the communication bridge that should have sent the heartbeat is assumed to have failed.

In one embodiment, the own communication stack of a communication bridge may be a TCP stack. More specifically, a communication stack implemented in the data processing system where the method according to one or more aspects of the invention is used, may comprise a TCP/IP stack. The TCP/IP stack is, e.g., outside of the operating system of the communication client, and thus, only one driver (e.g. hardware device driver) has to be developed which may be used by a number of different operating systems, from where a communication client is accessing this TCP/IP stack outside of its own operating system. This may be a very cost effective manner to operate a network interface.

In one embodiment, the first and the at least second communication bridges may be running a Linux operating system. Linux operating systems are commonly used open source operating systems, exhibiting a very cost efficient possibility to be implemented on a variety of communication bridges.

According to an embodiment, the system state information may contain information about a data packet count sent and/or received by the master communication bridge. Thus, after a failure of the master communication bridge and a possible change of the master communication bridge to one of the other former slave communication bridges, the necessary information will be available to continue the communication traffic. By one or more aspects of this method, there will be a reduced risk of loss of data packets sent or received by the communication client.

The system state information may contain information about an identifier for the last data packet sent and/or received. This feature exhibits a more efficient way of ensuring that no data packet will be lost after a failure of the master communication bridge and a continuation of the communication traffic by a new master communication bridge.

In one embodiment, the change of the master communication bridge may be implemented as a self-organized process of the data processing system. The first as well as the at least second communication bridges will determine which communication bridge is the master communication bridge and which communication bridge is a slave communication bridge, as well as after a failure of the master computer platform, which slave communication bridge will become the new master communication bridge.

Due to a further embodiment, a firewall may be implemented at the output of the first and the at least second communication bridges. Firewalls are widely used as a protection mechanism in communication with external networks. The method according to one or more aspects of the invention is suited to be implemented also on data processing systems using firewalls preventing data packets to be sent to a network interface by a slave communication bridge.

According to a further aspect of the invention, a data processing program for execution in a data processing system is provided comprising an implementation of an instruction set for performing a method as described above when the data processing program is run on a computer.

Further, a computer program product is provided comprising a computer usable medium including a computer readable program, wherein the computer readable program when executed on a computer causes the computer to perform a method for routing communication in a data processing system comprising a communication client running a first operating system having no own communication stack, a first communication bridge running a second operating system having an own communication stack, and at least a second communication bridge running a third operating system having an own communication stack, comprising routing communication from the communication client through the own communication stack of the first communication bridge and routing communication through the own communication stack of the at least second communication bridge, such routing between the communication client and the first and at least second communication bridges using a communication mechanism that does not include an own communication stack; configuring one of the first or the at least second communication bridges to act as a master communication bridge; and configuring the other of the at least second or first communication bridges to act as a slave communication bridge.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire connection, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is provided, comprising software code portions for performing a method described above.

What is claimed is:

1. A method for routing communication in a data processing system connected to a network, the system comprising a communication client running a first operating system having no own communication stack, a first communication bridge running a second operating system having an own communication stack, and at least a second communication bridge running a third operating system having an own communication stack, the method comprising:

routing communication from the communication client through both the own communication stack of the first communication bridge and the own communication stack of the second communication bridge, such routing between the communication client and the first and at least second communication bridges using a communication mechanism that does not include an own communication stack;

configuring one selected from the group consisting of the first and the at least second communication bridges to act as a master communication bridge;

configuring the other from the group consisting of the at least second and the first communication bridges to act as a slave communication bridge;

sending communication from the communication client to the network only via the master communication bridge; and sending communication from the network to the communication client only via the master communication bridge.

2. The method of claim 1, further comprising:

the communication client sending outgoing data to the first and at least second communication bridge, where the master communication bridge is sending the outgoing data through its own communication stack to a network;

the network sending incoming data through the communication stacks to the first and at least second communication bridge, the master communication bridge sending the incoming data to the communication client; and the master communication bridge and the slave communication bridge exchanging system state information on a regular basis, the system state information comprising information about a status of the outgoing data and the incoming data.

3. The method of claim 1, wherein, upon a lack of receiving system state information, after a predetermined time interval, a former slave communication bridge is selected to become the master communication bridge and a former master communication bridge is selected to become the slave communication bridge.

4. The method of claim 3, further comprising, after a change of the master communication bridge, in dependence on the exchanged system state information resending outgoing data by the master communication bridge to the network and resending incoming data by the master communication bridge to the communication client.

5. The method of claim 1, wherein the communication client, the first communication bridge, and the second communication bridge are implemented as virtual machines in the data processing system.

6. The method of claim 1, wherein the communication mechanism is implemented as a socket network.

7. The method of claim 1, wherein the communication mechanism is implemented as a remote direct memory access network.

8. The method of claim 2, wherein the system state information is selected to comprise heartbeat information.

9. The method of claim 1, wherein the own communication stack of the first communication bridge is selected to be a TCP stack.

10. The method of claim 1, wherein the second and third operating systems are different.

11. The method of claim 2, wherein the system state information is selected to contain information about a data packet count sent and received by the master communication bridge.

12. The method of claim 2, wherein the system state information is selected to contain information about an identifier for the last data packet sent and received.

13. The method of claim 1, wherein a change of the master communication bridge is implemented as a self-organized process of the data processing system.

14. The method of claim 1, further comprising using a firewall at the output of the first and at least second communication bridges.

15. A computer program product comprising a non-transitory computer usable medium including a computer readable program, wherein the computer readable program when executed on a computer system causes the computer system to perform a method for routing communication in a data processing system connected to a network, the system comprising a communication client running a first operating system having no own communication stack, and a first communication bridge running a second operating system having an own communication stack, and at least a second communication bridge running a third operating system having an own communication stack, the method comprising:

routing communication from the communication client through both the own communication stack of the first communication bridge and the own communication stack of the second communication bridge, such routing between the communication client and the first and at least second communication bridges using a communication mechanism that does not include an own communication stack;

configuring one selected from the group consisting of the first and the at least second communication bridges to act as a master communication bridge;

configuring the other from the group consisting of the at least second and the first communication bridges to act as a slave communication bridge;

sending communication from the communication client to the network only via the master communication bridge; and sending communication from the network to the communication client only via the master communication bridge.

16. The computer program product of claim 15, wherein the method further comprises:

the communication client sending outgoing data to the first and at least second communication bridge, where the master communication bridge is sending the outgoing data through its own communication stack to a network;

the network sending incoming data through the communication stacks to the first and at least second communication bridge, the master communication bridge sending the incoming data to the communication client; and the master communication bridge and the slave communication bridge exchanging system state information on a regular basis, the system state information comprising information about a status of the outgoing data and the incoming data.

17. The computer program product of claim 15, wherein the communication client, the first communication bridge, and the second communication bridge are implemented as virtual machines in the data processing system.

18. The computer program product of claim 15, wherein the communication mechanism is implemented as a socket network.

19. The computer program product of claim 15, wherein the communication mechanism is implemented as a remote direct memory access network.

20. The computer program product of claim 16, wherein the system state information is selected to comprise heartbeat information.

* * * * *